United States Patent
Templeton et al.

(10) Patent No.: US 9,443,118 B1
(45) Date of Patent: Sep. 13, 2016

(54) PAIRING TECHNIQUES FOR A WIRELESS CARD READER

(71) Applicant: Square, Inc., San Francisco, CA (US)

(72) Inventors: Thomas Templeton, San Francisco, CA (US); Elliot Sather, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/056,961

(22) Filed: Feb. 29, 2016

Related U.S. Application Data

(62) Division of application No. 13/786,373, filed on Mar. 5, 2013, now Pat. No. 9,312,949.

(51) Int. Cl.
*H04W 4/00* (2009.01)
*G06K 7/08* (2006.01)

(52) U.S. Cl.
CPC .............. *G06K 7/084* (2013.01); *H04W 4/008* (2013.01)

(58) Field of Classification Search
CPC ........... H04M 2250/14; H04M 76/02; H04M 1/72527; H04B 7/26; H04W 4/008; G06K 7/084
See application file for complete search history.

(56) References Cited

U.S. PATENT DOCUMENTS

| | | | |
|---|---|---|---|
| 5,434,395 A | 7/1995 | Storck et al. | |
| 7,810,729 B2 | 10/2010 | Morley, Jr. | |
| 9,022,291 B1 | 5/2015 | van der Merwe et al. | |
| 9,022,292 B1 | 5/2015 | van der Merwe et al. | |
| 2001/0021980 A1* | 9/2001 | Linden | G07C 9/00666 726/6 |
| 2005/0243059 A1* | 11/2005 | Morris | G06F 1/3203 345/158 |
| 2006/0219776 A1* | 10/2006 | Finn | B60R 25/25 235/380 |
| 2007/0070035 A1* | 3/2007 | Asbury | G06F 3/0231 345/156 |
| 2007/0251997 A1* | 11/2007 | Brown | G06K 7/0008 235/380 |
| 2008/0014984 A1* | 1/2008 | Brown | H04M 1/7253 455/552.1 |
| 2009/0188977 A1* | 7/2009 | Adams | G06K 7/0008 235/439 |
| 2010/0138666 A1* | 6/2010 | Adams | G06F 21/32 713/186 |
| 2010/0235621 A1* | 9/2010 | Winkler | H04L 63/0428 713/153 |
| 2011/0070834 A1 | 3/2011 | Griffin et al. | |

(Continued)

OTHER PUBLICATIONS

Zoltan, M.B., "How Do I Pair My Phone to a Bluetooth Device?," TechHive, Published on Nov. 1, 2010, Retrieved from the Internet URL: http://www.techhive.com/article/209431/pair_phone_with_bluetooth_device.html, on Nov. 10, 2014, pp. 1-3.

(Continued)

*Primary Examiner* — Lewis West
(74) *Attorney, Agent, or Firm* — Perkins Coie LLP

(57) ABSTRACT

Methods, systems, and apparatus, for pairing a wireless card reader and a computing device, including: receiving first user input setting the wireless card reader in a pairing mode; sending an indication from the wireless card reader to the computing device that a pairing mode of the wireless card reader is enabled; receiving an indication from the computing device that a pairing mode of the computing device is enabled; receiving, in the wireless card reader, a second user input of a sequence of actuations of a sensor on the wireless card reader; determining, on the wireless card reader, whether the sequence of actuations matches a stored sequence; and in response to determining that the sequence of actuations matches a stored sequence, pairing the wireless card reader with the computing device.

26 Claims, 13 Drawing Sheets

(56) References Cited

U.S. PATENT DOCUMENTS

| | | | |
|---|---|---|---|
| 2012/0126011 A1* | 5/2012 | Lamba | G06Q 20/322 235/449 |
| 2013/0096701 A1* | 4/2013 | Suorajaervi | A61G 13/02 700/83 |
| 2013/0328801 A1* | 12/2013 | Quigley | G06Q 20/3674 345/173 |
| 2014/0001263 A1 | 1/2014 | Babu et al. | |
| 2014/0001264 A1* | 1/2014 | Babu | G06F 1/3287 235/440 |

OTHER PUBLICATIONS

Restriction Requirement mailed Aug. 5, 2015, for U.S. Appl. No. 13/786,373, of Templeton, T., et al., filed Mar. 5, 2013.

Non-Final Office Action mailed Nov. 5, 2015, for U.S. Appl. No. 13/786,373, of Templeton, T., et al., filed Mar. 5, 2013.

Notice of Allowance mailed Dec. 22, 2015, for U.S. Appl. No. 13/786,373, of Templeton, T., et al., filed Mar. 5, 2013.

\* cited by examiner

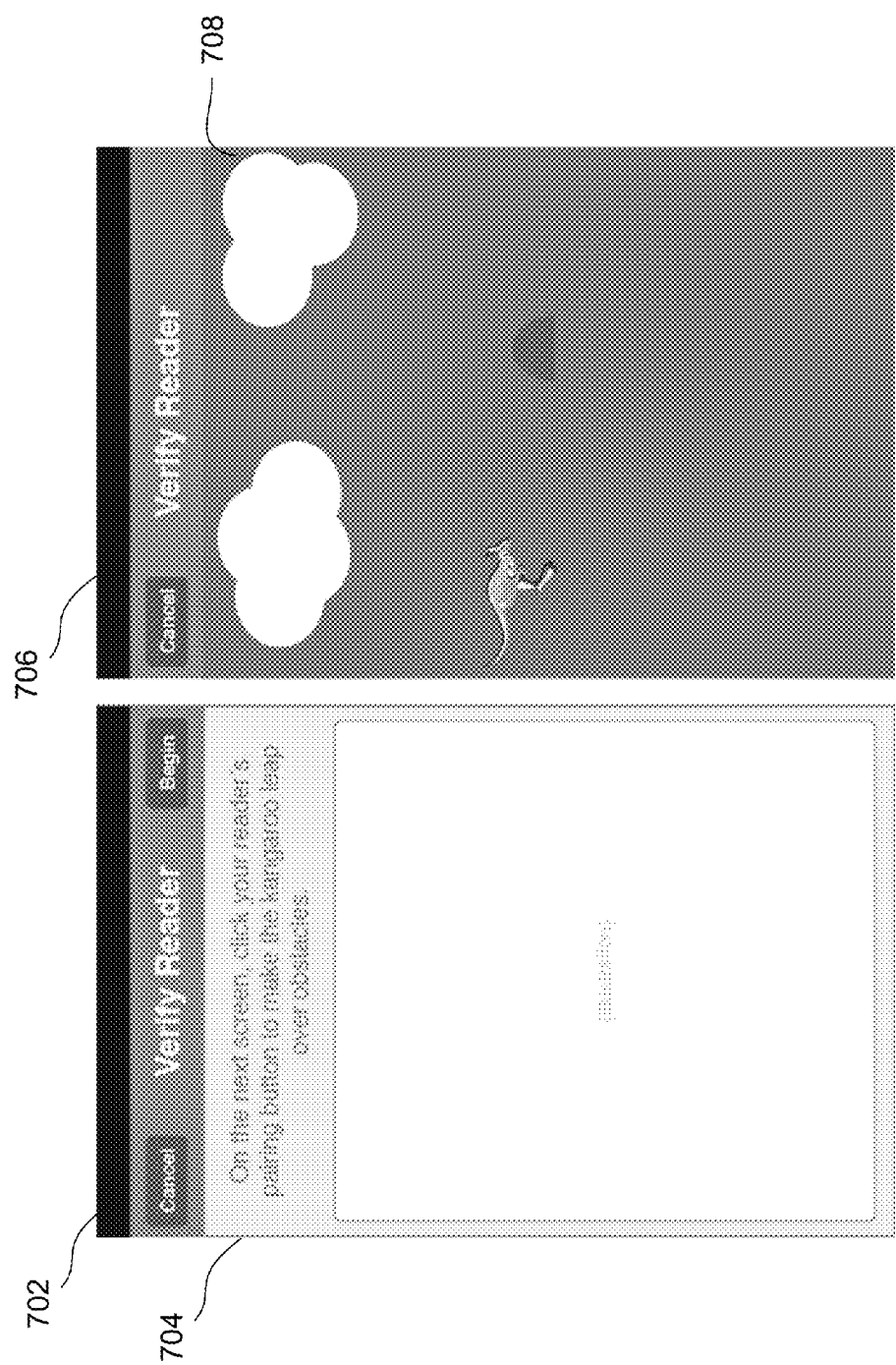

PAIRING TECHNIQUES FOR A WIRELESS CARD READER

This is a divisional of U.S. patent application Ser. No. 13/786,373, filed on Mar. 5, 2013, which is incorporated by reference herein in its entirety.

TECHNICAL FIELD

This disclosure relates to a mobile card reader.

BACKGROUND

Generally, a merchant uses a terminal to process a transaction. The terminal is connected, usually with wires, to a cash register and to an Internet connection. Some terminals process chip cards. For such terminals, a card is inserted into the terminal and the user enters a Personal Identification Number (PIN) on a keypad of the terminal. Other terminals process magnetic stripe cards. For such terminals, the card is swiped through a slot.

Mobile card readers are available for magnetic stripe cards. Some mobile card readers, e.g., mobile card readers installed in taxies, use cellular technology to communicate wirelessly with the credit card processor.

Conventional point of sale electronic credit card transactions are authorized and captured. In the authorization stage, a physical credit card with a magnetic stripe is swiped through a merchant's magnetic card reader, e.g., as part of a point of sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, the card network, and the card issuer. The payment request can include the cardholder's signature (if appropriate). The capture state can trigger the financial transaction between the card issuer and the merchant, and optionally create a receipt. There can also be other entities, e.g., the card acquirer, in the route of the transaction. Debit card transactions have a different routing, but also require swiping of the card.

SUMMARY

A wireless card reader can be paired (e.g., configured to communicate wirelessly) with a computing device using various techniques that do not require interaction with a graphical display on the wireless card reader.

In one example, users can pair a wireless card reader with a computing device using a code verification technique that involves inputting a code that is printed on the wireless card reader into a user interface presented on the computing device. In another example, users can pair a wireless card reader with a computing device using a name verification technique that involves inputting a name that is printed on the wireless card reader into a user interface presented on the computing device. Further, in another example, users can pair a wireless card reader with a computing device using a clicker verification technique that instructs a user to click a pairing button located on the wireless card reader in response to certain visual cues. As used in the specification, the pairing button can refer to a button, a switch, or a sensor.

Depending on technique used, the computing device is paired with the wireless card reader when a user has performed the requested actions (e.g., inputting a code or name, or clicking the pairing button as instructed). Once pairing is complete, the wireless card reader can be used to receive card swipes or insertions. The received card swipes or card insertions can be wirelessly communicated to the computing device to perform financial transactions.

In one aspect, a method includes configuring the wireless card reader for pairing mode, wherein the wireless card reader is configured for pairing mode based on an interaction with a pairing button on the wireless card reader; configuring the computing device for pairing mode; accessing, on the computing device, a user interface for pairing the wireless card reader with the computing device, the user interface presenting one or more visual cues for pairing the wireless card reader; in response to the user interface presenting the one or more visual cues for pairing the wireless card reader, engaging a pairing button on the wireless card reader for one or more instances, each respective engagement of the pairing button being synchronized with a respective visual cue being presented on the user interface; determining, on the wireless card reader, whether the pairing button was successfully engaged for the one or more instances; and in response to determining that the pairing button was successfully engaged, pairing the wireless card reader with the computing device. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Implementations may include one or more of the following. Configuring a wireless card reader for pairing mode comprises: accessing, on a computing device, a user interface for pairing the wireless card reader, the user interface presenting instructions for enabling a pairing mode the wireless card reader; and configuring the wireless card reader for pairing mode based on the presented instructions. Configuring a wireless card reader for pairing mode comprises opening a battery door located on the wireless card reader. The method further includes: receiving, on the computing device and from the wireless card reader, data describing a pairing technique for pairing the wireless card reader; and identifying one or more visual cues based on a pairing technique identified by the data describing the pairing technique.

Engaging the pairing button comprises a combination of pressing and holding the pairing button for one or more instances, each instance being for a specified time duration. Determining, on the wireless card reader, whether the pairing button was successfully engaged for the one or more instances includes: determining, on the wireless card reader, whether an actual timing of each instance the pairing button on the wireless card reader is engaged satisfies a desired timing for the pairing button to be engaged, the desired timing describing a time that corresponds with an occurrence of a visual cue. The one or more visual cues comprise an animated analog clock. The one or more visual cues comprise an animated traffic stoplight. The one or more visual cues comprise an animated game.

In one aspect, a method of pairing a wireless card reader and a computing device, includes: receiving first user input setting the wireless card reader in a pairing mode; sending an indication from the wireless card reader to the computing device that a pairing mode of the wireless card reader is enabled; receiving an indication from the computing device that a pairing mode of the computing device is enabled; receiving, in the wireless card reader, a second user input of a sequence of actuations of a sensor on the wireless card reader; determining, on the wireless card reader, whether the sequence of actuations matches a stored sequence; and in response to determining that the sequence of actuations matches a stored sequence, pairing the wireless card reader with the computing device.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Advantages may include one or more of the following. A computing device can be paired with a wireless card reader by performing various pairing techniques that do not require a graphical display on the wireless card reader. Pairing of a computing device and a wireless card reader can be accomplished without including a graphical display on the wireless card reader using a code or name verification technique. Pairing of a computing device and a wireless card reader can be accomplished without including a graphical display on the wireless card reader using a clicker verification technique.

BRIEF DESCRIPTION OF THE DRAWINGS

FIGS. 7A-7B illustrate another example technique for clicker verification.

Like reference numbers and designations in the various drawings indicate like elements.

DETAILED DESCRIPTION

Figure 1:
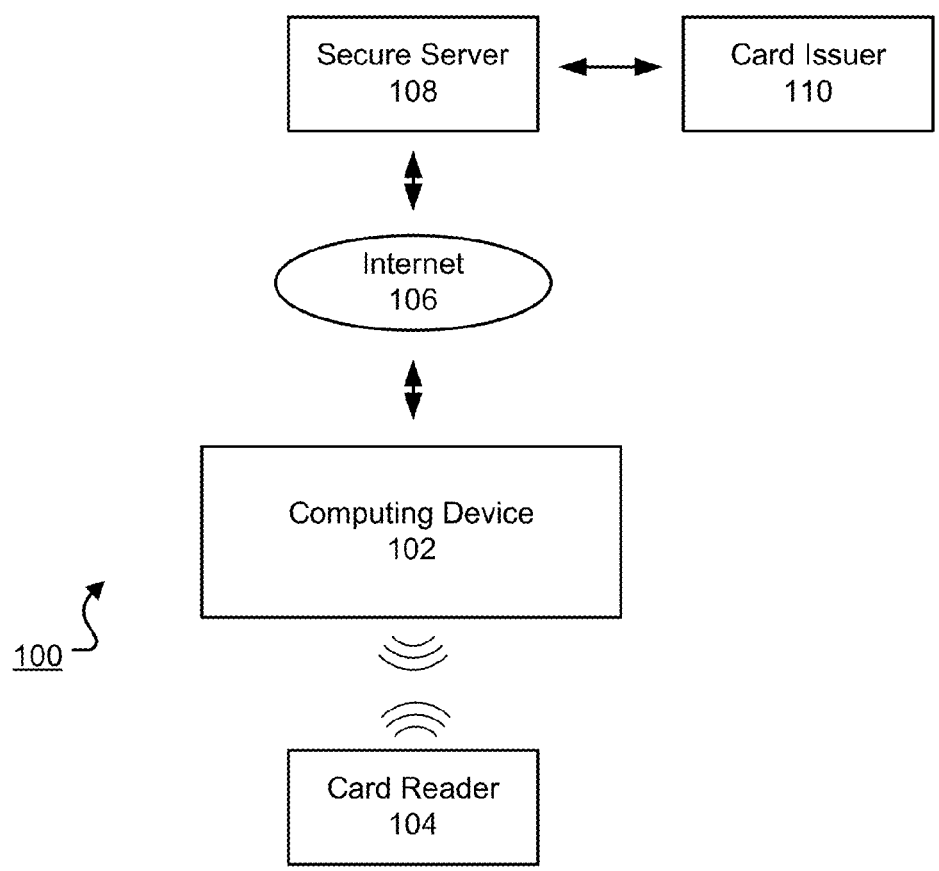
FIG. 1 is a schematic illustration of an example system for conducting a transaction using a wireless card reader.

FIG. 1 is a schematic illustration of an example system 100 for conducting a transaction using a wireless card reader. A transaction can include reading cards such as payment cards (e.g., credit cards), drivers license cards, identification cards, etc. The system 100 is capable of processing a payment transaction between a mobile computing device 102 and a wireless card reader 104.

The computing device 102 can be a mobile device or a desktop device. Mobile devices include smart phones, tablet computers, laptops, or other mobile data processing apparatus.

The wireless card reader 104 can process magnetic stripe cards or smart chip cards. Smart chip cards can be processed according to the Europay, Mastercard, Visa (EMV) protocol. In some implementations, the wireless card reader 104 processes cards using Near Field Communication (NFC) hardware and the NFC protocol. The wireless card reader 104 is built with one or more mechanisms to capture card data and to communicate wirelessly with the computing device 102. Thus, the wireless card reader can be smaller, lighter and simpler than card readers with integrated keypads or displays. The wireless card reader 104 need not include a keypad, a display, an interface for receiving signatures, e.g., a touch screen display, or a cellular connection to a payment processing system on an external network, e.g., the Internet.

The computing device 102 can communicate with the wireless card reader 104 wirelessly. Wireless communication can be over a wireless local area network or shorter range wireless network, and can occur in many forms, e.g., Bluetooth, WiFi, or NFC. In some implementations, a Bluetooth Low Energy protocol is used. The wireless card reader 104 can broadcast data to the computing device 102 and vice-versa. In some implementations, the wireless card reader 104 and the computing device 102 undergo a pairing process before establishing communication to verify a source and destination for data transfer, as described below.

For a payment transaction using a magnetic stripe card, a card can be swiped at the wireless card reader 104. The wireless card reader 104 sends card data of the magnetic stripe card to the computing device 102 using an antenna. The computing device 102 can be waiting to receive card data from the wireless card reader 104, e.g., by scanning for Bluetooth data broadcasts. The remainder of the transaction can occur between the computing device 102 and other card processing systems.

For a payment transaction using a smart chip card, a card can be inserted into the card reader 104 so that the reader engages electrical contacts for a microchip on the card. The card reader 104 sends a PIN request to the computing device 102 using the antenna. The computing device 102 receives a PIN from the user, e.g., entered through a user interface on or connected to the computing device, and sends the PIN to the card reader 104 for confirmation, e.g., wirelessly. The card reader 104 sends the PIN to the card, which contains a chip with an embedded PIN. The card compares the received PIN to the embedded PIN. If the PINs match, the card sends a confirmation to the card reader 104, which sends the confirmation to the computing device 102 wirelessly.

After receiving data, e.g., card data or a confirmation, from either the magnetic stripe card or the smart chip card, the computing device 102 can transmit an authorization for transaction to a secure server 108 for payment processing, e.g. by using an external network such as the Internet 106. The secure server 108 can relay the transaction to the card issuer 104, which ultimately approves or denies the transaction. The card issuer 104 can communicate the approval or denial to the secure server 108, which can relay the card issuer's approval or denial to the computing device 102.

Figure 2:
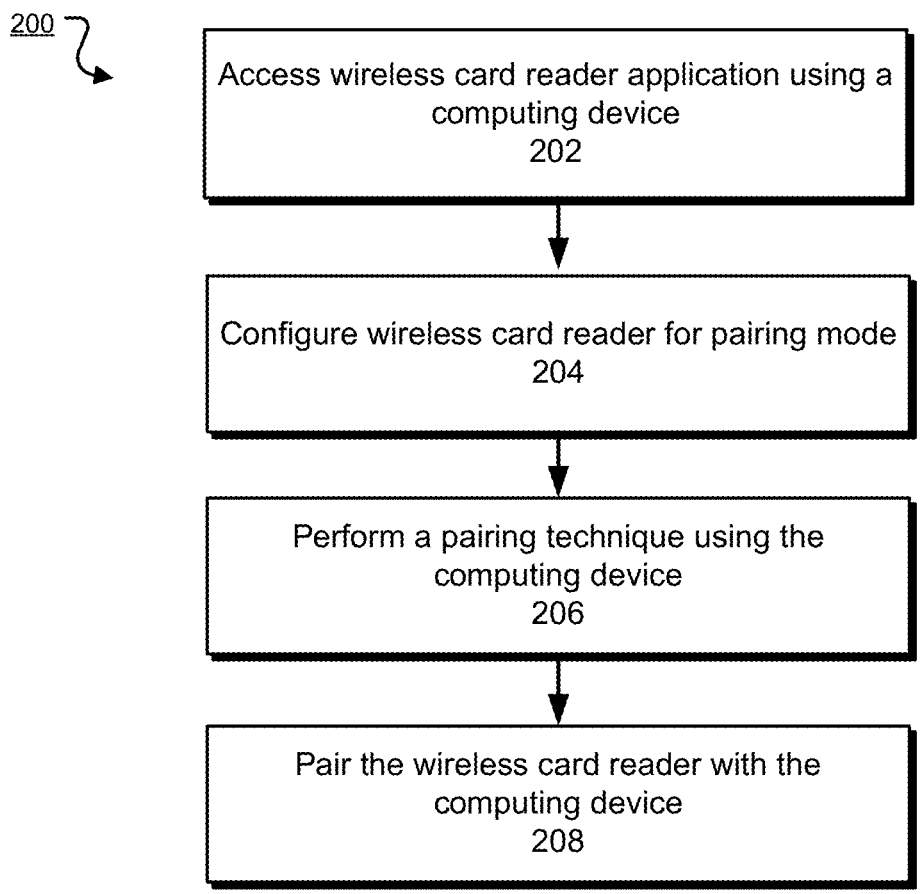
FIG. 2 is a diagram of an example flow chart for pairing a wireless card reader.

FIG. 2 is a diagram of an example flow chart 200 for pairing a wireless card reader. For convenience, the process 200 will be described as performed using a computing device, e.g., the computing device 102, and a card reader, e.g., the card reader 104.

The user accesses a wireless card reader application using a computing device (202). The card reader application can provide the user with instructions on how to pair a wireless card reader, as described in reference to FIGS. 3A, 4A, and 5A. In some implementations, the computing device determines which pairing technique to use based on data (e.g., a version number) that is received from the wireless card reader during the device discovery phase. For example, when the wireless card reader is in discovery mode, the computing device can search for and locate the wireless card reader. As part of the discovery phase, the computing device can access an identifier associated with the wireless card reader that identifies the model of the wireless card reader and a version number, e.g., a firmware version number, of the wireless card reader.

The user configures a wireless card reader for pairing mode (204). Depending on the implementation, the wireless card reader can be configured for pairing mode by opening a battery door located on the wireless card reader, as described in reference to FIG. 3B, or by pressing and holding a pairing button located on the wireless card reader, as described in reference to FIGS. 4B and 5B.

The user performs a pairing technique using the computing device (206). Depending on the implementation, the pairing technique can be a code verification technique, as described in reference to FIGS. 3D-3E, a name verification technique, as described in reference to FIGS. 4D-4E, or a clicker verification technique, as described in reference to FIGS. 5D-5E, 6A-6B, and 7A-7B.

The user pairs the wireless card reader with the computing device once the pairing technique is performed successfully (208). For example, the pairing technique is performed successfully when the user correctly verifies the code or name printed on the wireless card reader, or when the user successfully clicks the pairing button on the wireless card reader, as instructed.

Figure 3A:
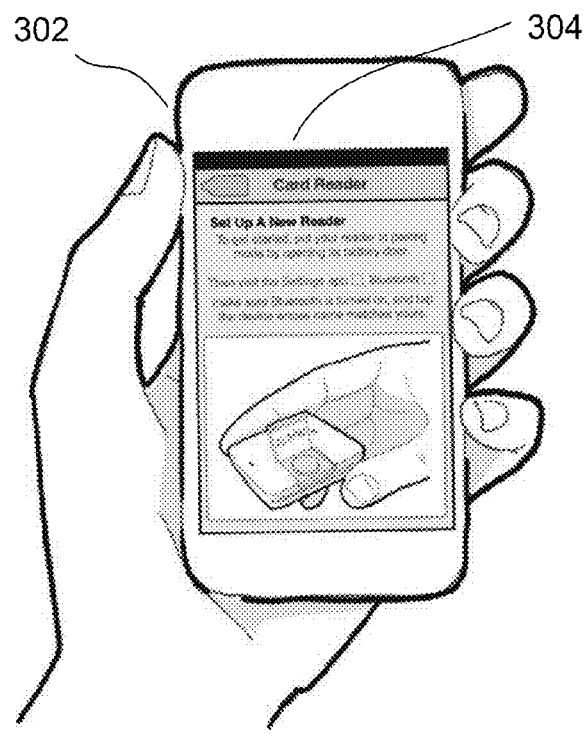
FIGS. 3A-3F illustrate a code verification technique for pairing a wireless card reader.
Figure 3B:
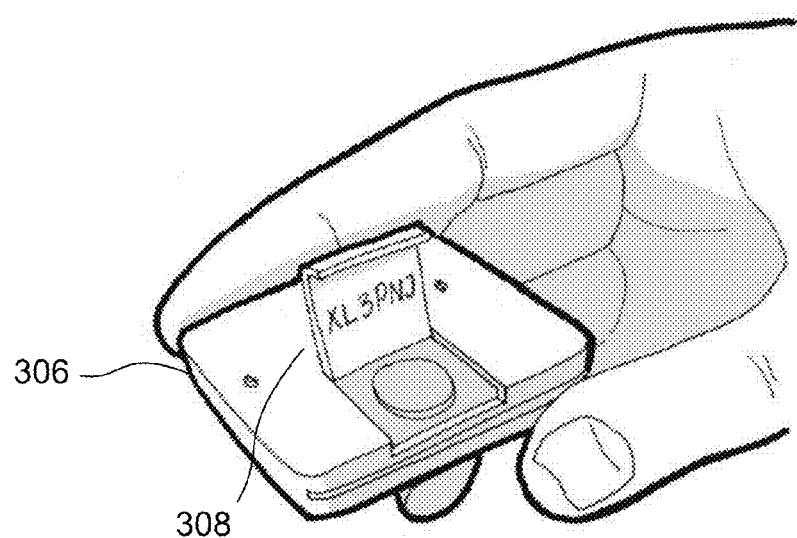

FIG. 3A illustrates an example user interface 304 for a code verification technique being presented on a computing device 302. The user interface 304 provides instructions for pairing a wireless card reader using a code verification technique. In some implementations, the code verification technique involves inputting, into the computing device 302, a code that is printed on the wireless card reader, e.g., on the inside of a battery door of the reader (as shown in FIG. 3B). The computing device 302 can send the inputted code to the wireless card reader. The wireless card reader can evaluate the code received from the computing device 302 to determine whether the received code matches the code that is printed on the wireless card reader. If the codes match, the computing device 302 is paired with the wireless card reader.

In some implementations, the wireless card reader is configured for pairing mode by opening the wireless card reader's battery door, as described in reference to FIG. 3B. In such implementations, the user interface 304 provides instructions that instruct a user to enable a pairing mode on the wireless card reader by opening the wireless card reader's battery door. The user interface 304 also presents instructions for configuring the computing device 302 to communicate with the wireless card reader. The instructions can vary depending on the type of the computing device 302. For example, for computing devices that need to be manually configured to communicate with the wireless card reader, the user interface 304 can provide instructions for configuring the computing device 302 to communicate with the wireless card reader, as described in reference to FIG. 3C.

FIG. 3B illustrates an example wireless card reader 306. In FIG. 3B, the battery door 308 of the wireless card reader 306 is shown as having been opened. Opening the battery door 308 can trigger a switch in the wireless card reader 306. Triggering of the switch can send a signal that is detected by software or firmware running on the wireless card reader 306. The wireless card reader 306 is configured to enter a pairing mode with the computing device 302 once the signal is detected by software or firmware running on the wireless card reader 306.

Figure 3C:
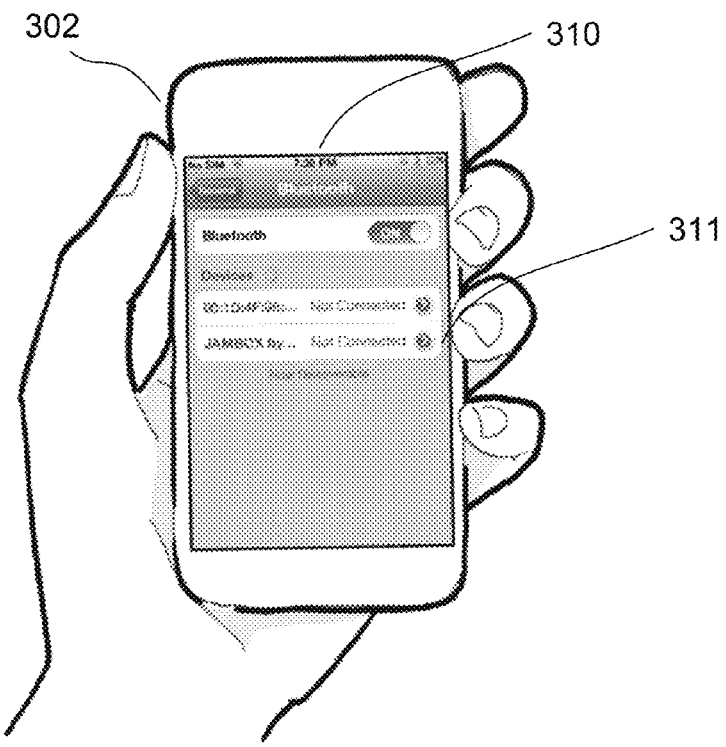

FIG. 3C illustrates an example user interface 310, being presented on the computing device 302, for pairing the computing device 302 with the wireless card reader. The user can interact with the user interface 310 to enable a wireless communication protocol, e.g., Bluetooth, and to select the wireless card reader from a list 311 of detected devices. Once the wireless card reader is selected, the computing device 302 can then communicate with the wireless card reader to receive data (e.g., data indicating that a user has clicked a pairing button located on the wireless card reader).

Figure 3D:
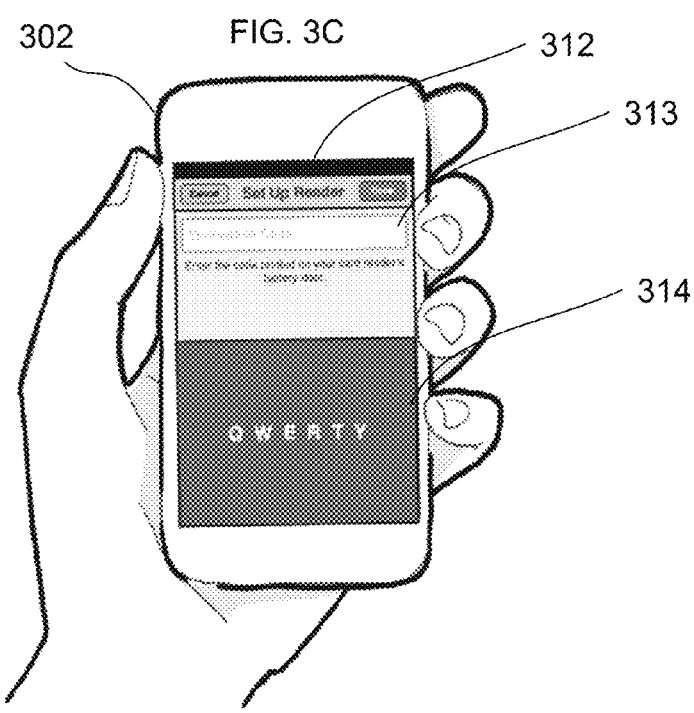

FIG. 3D illustrates an example user interface 312, being presented on the computing device 302, for verifying a code for the wireless card reader. In FIG. 3D, the user interface 312 presents the user with a text box 313 for inputting a code for verifying the wireless card reader. In some implementations, the code is printed inside the battery door of the wireless card reader, as described in reference to FIG. 3E. The user can interact with a virtual keyboard 314 included in the user interface 312 to input the code verifying the wireless card reader. The computing device 302 can send the inputted code to the wireless card reader. The wireless card reader can evaluate the code received from the computing device 302 to determine whether the received code matches the code for the wireless card reader. If the code matches, the computing device 302 is paired with the wireless card reader, as described in reference to FIG. 3F.

Figure 3E:
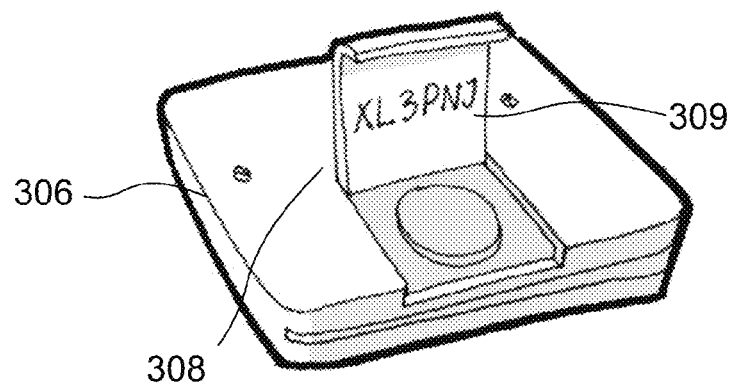

FIG. 3E illustrates an example wireless card reader 306. In FIG. 3E, the battery door of the wireless card reader 308 is shown in an open position. In some implementations, the wireless card reader is configured for pairing mode by opening the wireless card reader's battery door, as described above. A code 309 for verifying the wireless card reader is printed on the inside of the battery door 308. The code 309 can be used to validate the wireless card reader in a user interface, as described in reference to FIG. 3D.

Figure 3F:
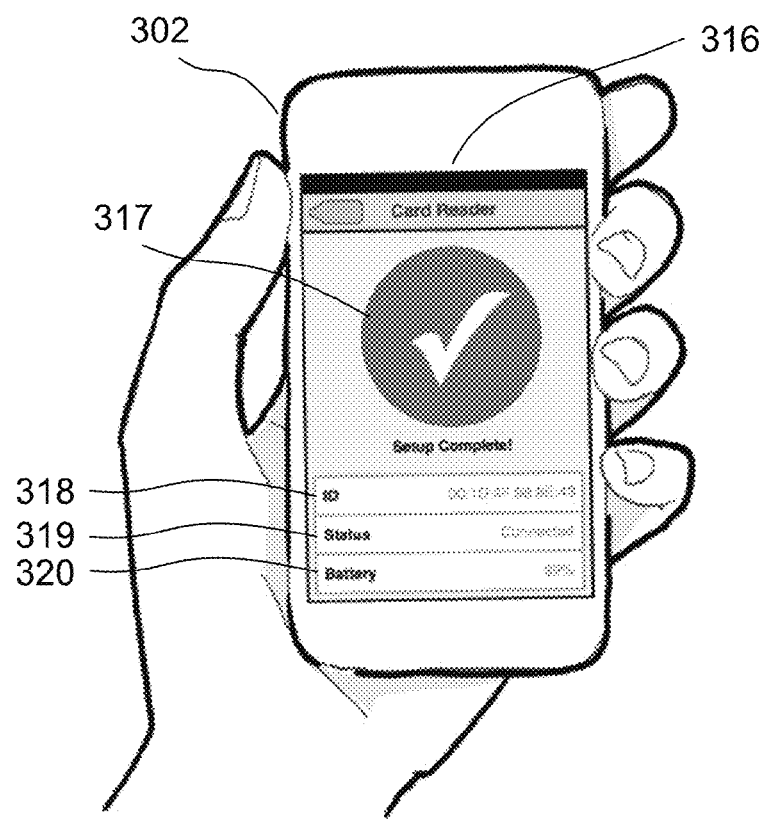

FIG. 3F illustrates an example user interface 316, being presented on the computing device 302, for confirming a pairing of the computing device 302 with the wireless card reader. In FIG. 3F, the user interface 316 presents the user with information confirming the pairing of the computing device 302 with the wireless card reader. Depending on the implementation, the information can include a graphic 317 indicating a successful pairing, an identification number 318 for the wireless card reader, a connection status 319 (e.g., "connected") of the wireless card reader, and the remaining battery life 320 of the wireless card reader.

Figure 4A:
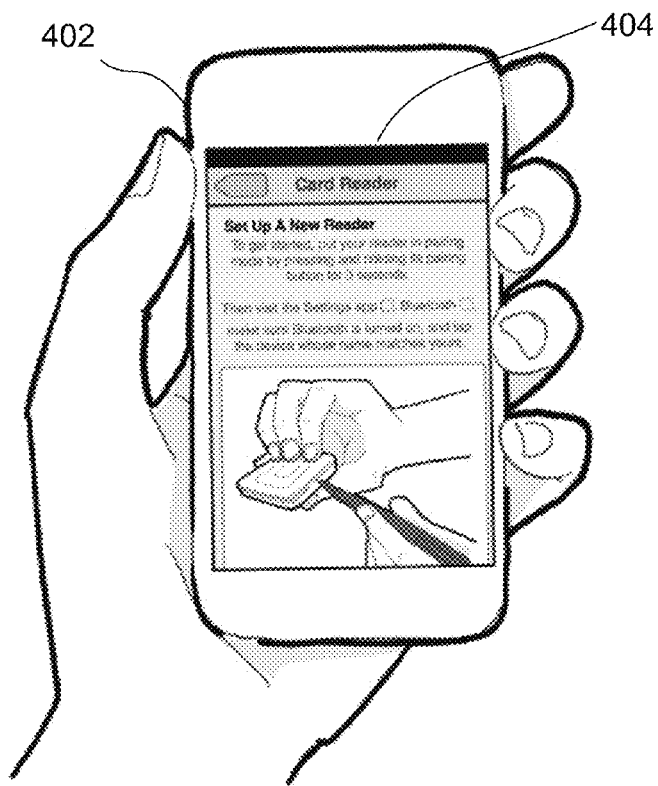
FIGS. 4A-4F illustrate a reader name verification technique for pairing a wireless card reader.

FIG. 4A illustrates an example user interface 404 for a name verification technique being presented on a computing device 402. The user interface 404 provides instructions for pairing a wireless card reader using a name verification technique. In some implementations, the name verification technique involves inputting, into the computing device 402, a name that is printed on the wireless card reader. The computing device 402 can send the inputted name to the wireless card reader. The wireless card reader can evaluate the name received from the computing device 402 to compare the inputted name with the name that is printed on the wireless card reader. Pairing of the computing device 402 with the wireless card reader is complete if the inputted name matches the name that is printed on the wireless card reader.

Figure 4B:
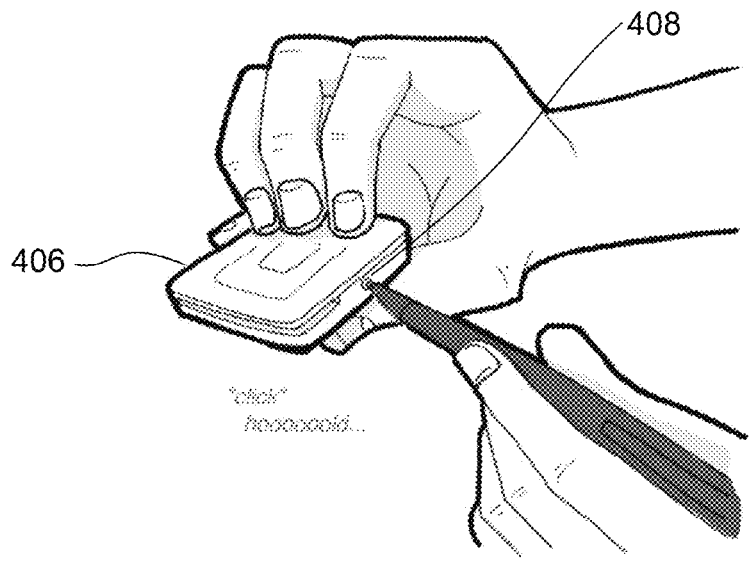

In some implementations, the wireless card reader is configured for pairing mode by pressing and holding a pairing button on the wireless card reader for a specified duration of time (e.g., three seconds), as described in reference to FIG. 4B. In such implementations, the user interface 404 provides instructions that instruct a user to pair the wireless card reader by pressing and holding the pairing button on the wireless card reader for a specified duration.

FIG. 4B illustrates an example wireless card reader 406. In FIG. 4B, a pairing button 408 on the wireless card reader 406 is shown as having been pressed and held for a specified duration of time. The wireless card reader 406 is configured for pairing mode when the pairing button 408 has been held for the specified duration of time.

Figure 4C:
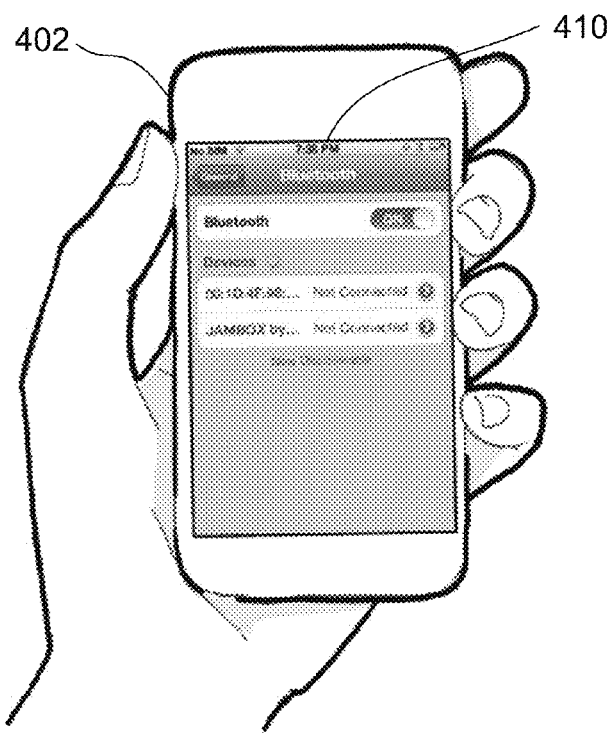

FIG. 4C illustrates an example user interface 410, being presented on the computing device 402, for pairing the computing device 402 with the wireless card reader, as described in reference to FIG. 3C.

Figure 4D:
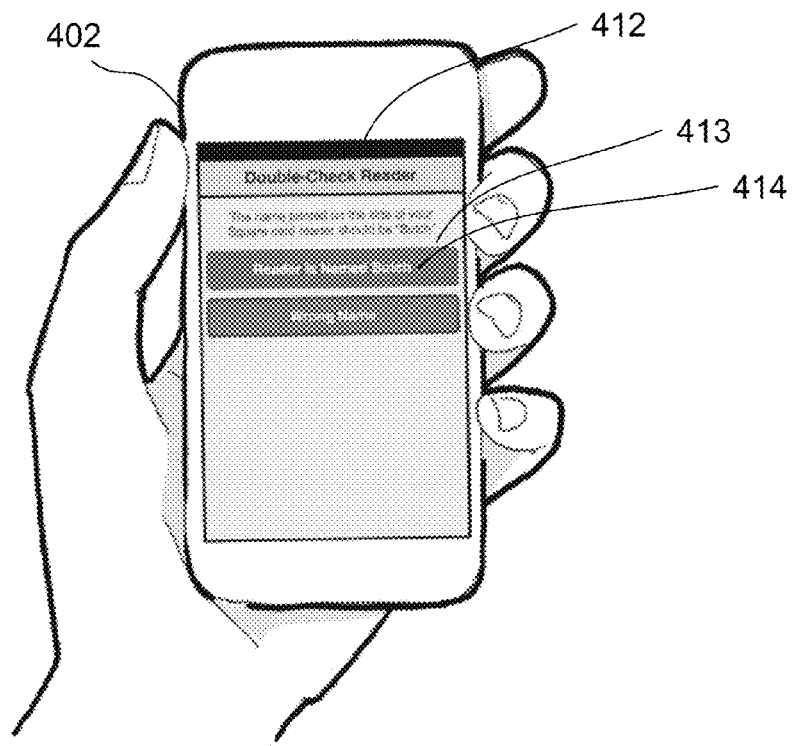

FIG. 4D illustrates an example user interface 412, being presented on the computing device 402, for verifying a name for the wireless card reader. In FIG. 4D, the user interface 412 presents the user with options 413 for confirming whether the name 414 displayed on the user interface 412 matches the name for the wireless card reader. In some implementations, the name 414 is printed on the wireless card reader, as described in reference to FIG. 4E. The user can select one of the options 413 to confirm whether the name 414 displayed on the user interface 412 matches the name that is printed on the wireless card reader. The computing device 402 can send the selected name 414 to the wireless card reader. The wireless card reader can evaluate the name 414 received from the computing device 402 to determine whether the name 414 matches the name printed on the wireless card reader. If the name 414 matches the name printed on the wireless card reader, the computing device 402 is paired with the wireless card reader, as described in reference to FIG. 4F.

Figure 4E:
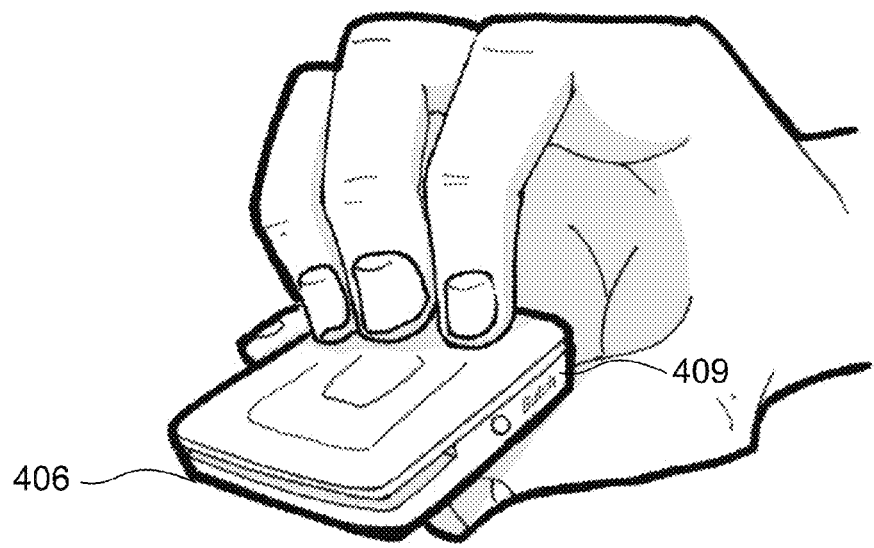

FIG. 4E illustrates an example wireless card reader 406. FIG. 4E shows the printed name 409 ("Butch") for the wireless card reader 406. The name 409 can be used to validate the wireless card reader in a user interface, as described in reference to FIG. 4D.

Figure 4F:
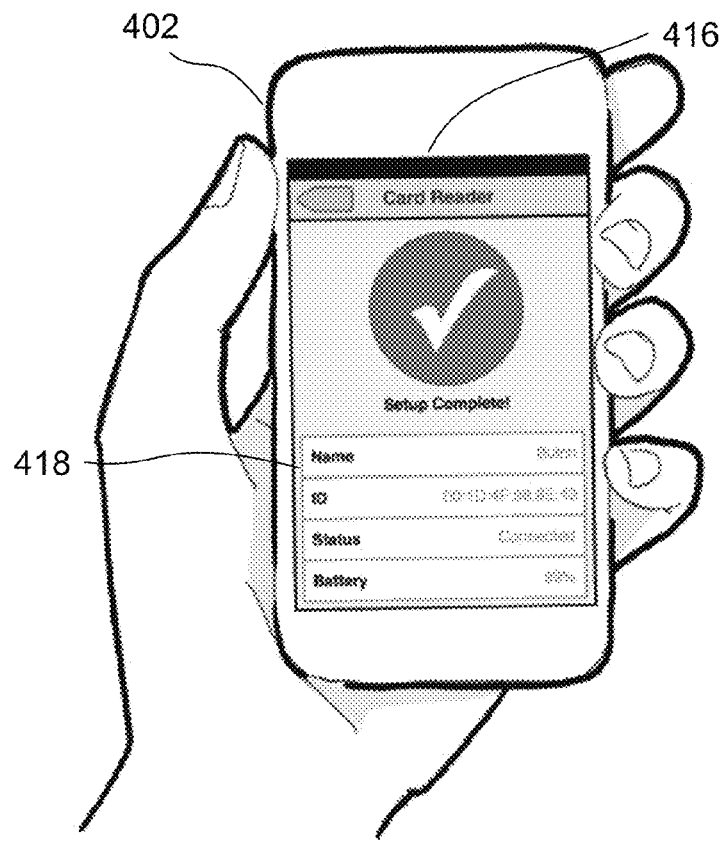

FIG. 4F illustrates an example user interface 416, being presented on the computing device 402, for confirming a pairing of the computing device 402 with the wireless card reader, as described in reference to FIG. 3F. In some implementations, the user interface 416 presents the user with the name 418 of the wireless card reader.

Figure 5A:
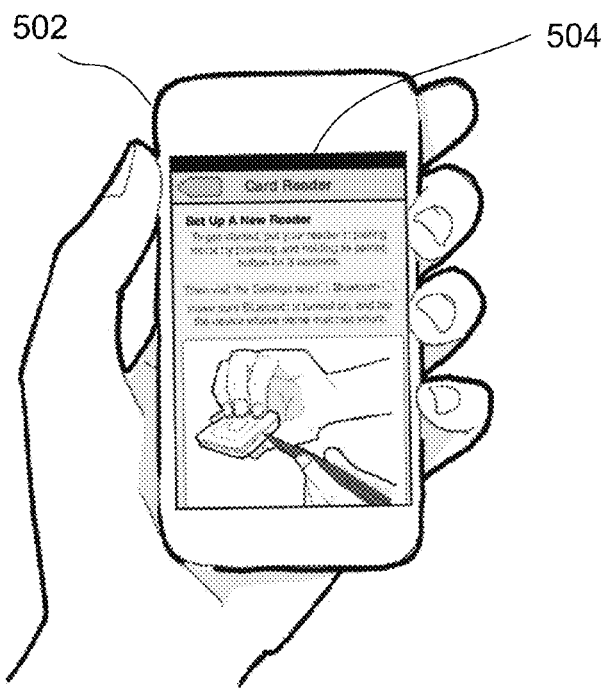
FIGS. 5A-5F illustrate a clicker verification technique for pairing a wireless card reader.

FIG. 5A illustrates an example user interface 504 for a clicker verification technique being presented on a computing device 502. The user interface 504 provides instructions for pairing a wireless card reader using a clicker verification technique. In some implementations, the clicker verification technique involves pressing and holding a pairing button on the wireless card reader for one or more instances, each instance being for a specified duration of time, as described in reference to FIGS. 5D, 6A-6B, and 7A-7B. As described below, the one or more instances can be a particular pattern of instances (e.g., press and hold the pairing button three separate times, each time for a period of five seconds). In some implementations, the pressing and holding of the pairing button is synchronized with visual cues presented on a user interface.

Figure 5B:
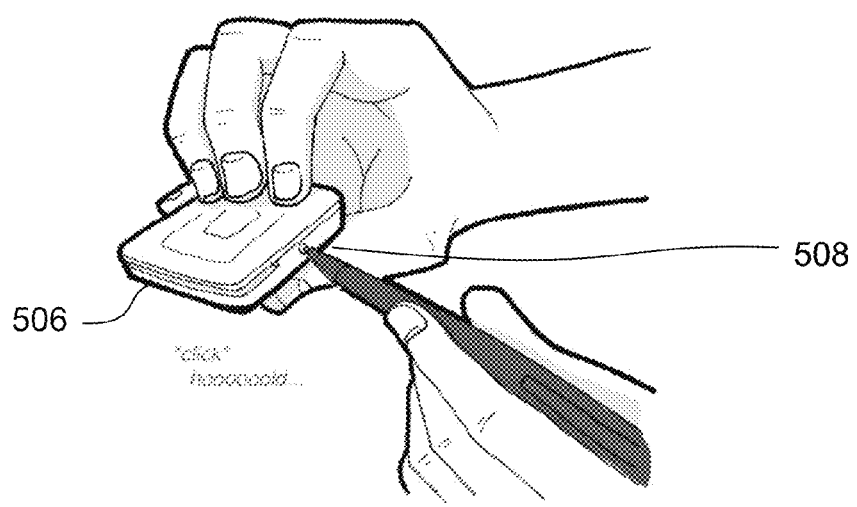

In some implementations, the wireless card reader is configured for pairing mode by pressing and holding a pairing button on the wireless card reader for a specified duration of time (e.g., three seconds), as described in reference to FIG. 5B. In such implementations, the user interface 504 provides instructions that instruct a user to pair the wireless card reader by pressing and holding the pairing button on the wireless card reader for a specified duration.

FIG. 5B illustrates an example wireless card reader 506. In FIG. 5B, a pairing button 508 on the wireless card reader 506 is shown as having been pressed and held for a specified duration of time. The wireless card reader 506 is configured for pairing with the computing device once the pairing button has been held for the specified duration of time.

Figure 5C:
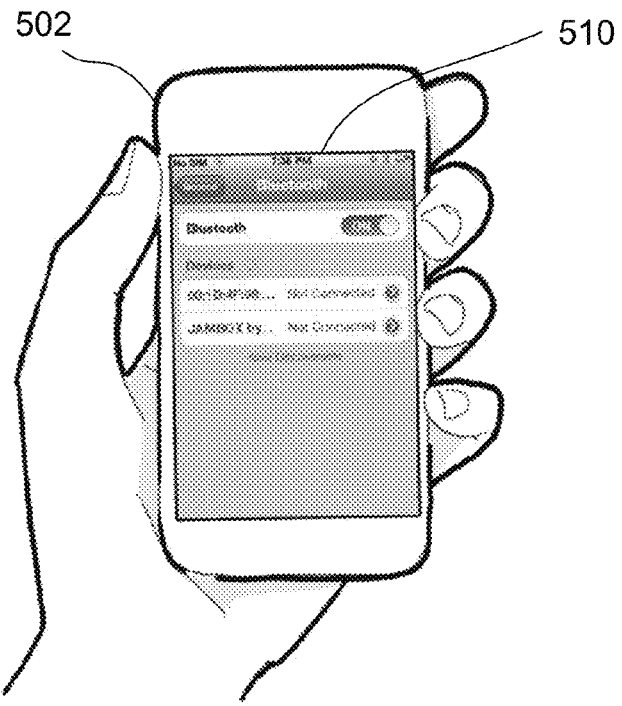

FIG. 5C illustrates an example user interface 510, being presented on the computing device 502, for pairing the computing device 502 with the wireless card reader, as described in reference to FIG. 3C.

Figure 5D:
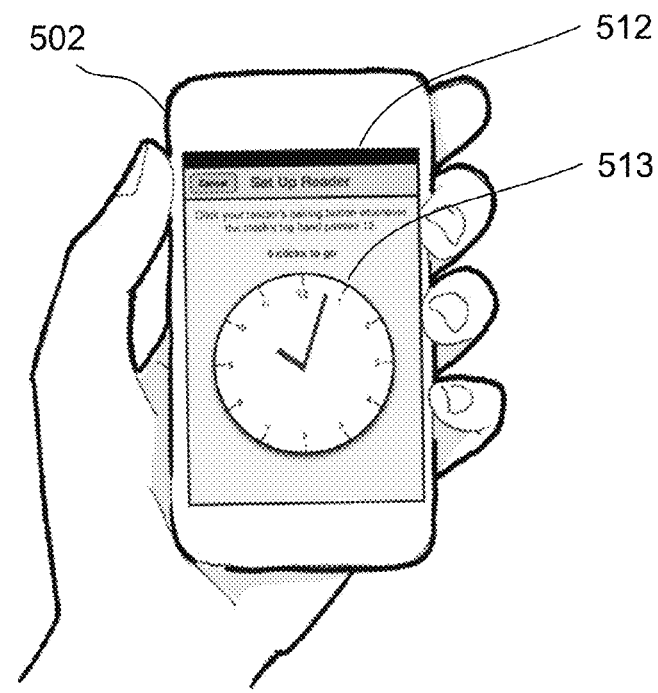

FIG. 5D illustrates an example user interface 512, being presented on the computing device 502, providing a visual cue for performing clicker verification. In FIG. 5D, the user interface 512 displays a virtual analog clock 513. The user interface 512 also provides the user instructions for performing clicker verification. In some implementations, the user is instructed to click the pairing button on the wireless card reader when a certain event occurs. For example, the user can be instructed to click the pairing button when the clock's 513 large moving hand passes a particular point on the clock (e.g., the 12-hour mark). The number of events for which the user needs to click the pairing button can vary depending on the implementation. For example, the user can be instructed to click the pairing button each time the clock's 513 large moving hand passes the 12-hour mark, for a total of five independent times the clock's 513 large moving hand passes the 12-hour mark.

The computing device 502 can send data describing the timing of when the user should click the pairing button to the wireless card reader. The wireless card reader can compare the actual timing of when the user clicks the pairing button to the data describing the desired timings to determine whether the user has successfully clicked the pairing button on the wireless card reader at a time that is in synch with the occurrence of the certain event. For example, the wireless card reader can determine whether the user has clicked the pairing button on the wireless card reader at or about the same time as the time the clock's 512 large moving hand passes the 12-hour mark by comparing a time when the user clicked the pairing button with a time corresponding to the 12-hour mark. The computing device 502 is paired with the wireless card reader once the wireless card reader determines that the user has successfully clicked the pairing button for a specified number of times, as described in reference to FIG. 5F.

Figure 5E:
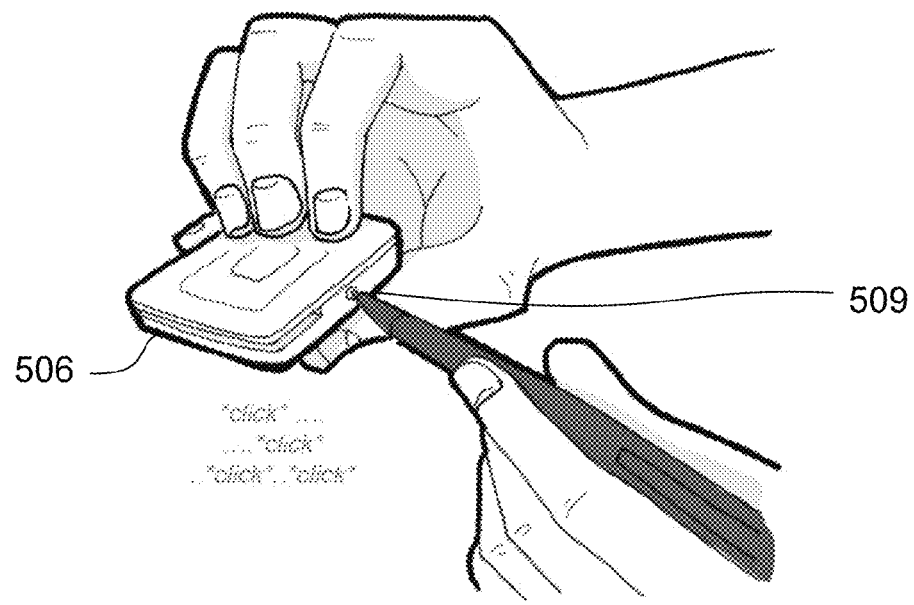

FIG. 5E illustrates an example wireless card reader 506. The wireless card reader 506 includes a pairing button 509 for use in performing a clicker verification technique. A user can interact with the pairing button to perform a clicker verification technique.

Figure 5F:
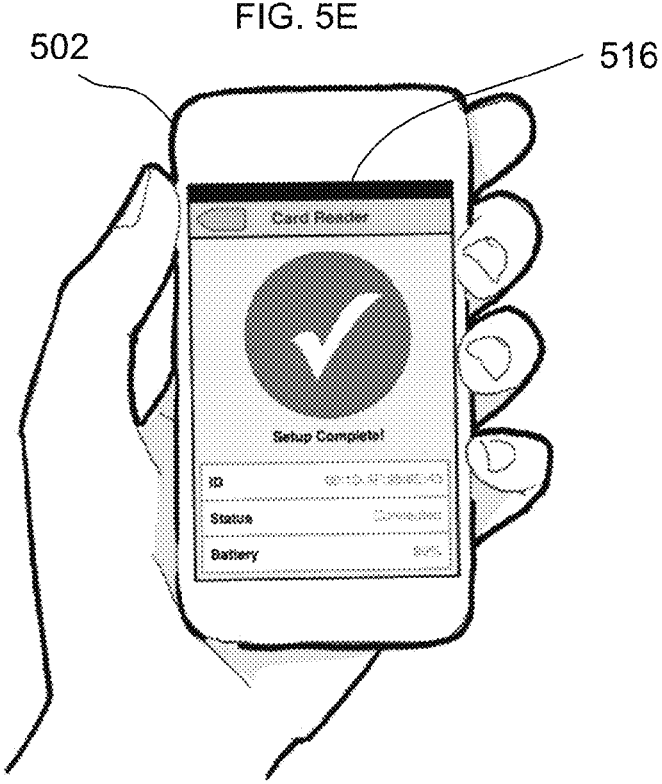

FIG. 5F illustrates an example user interface 516, being presented on the computing device 502, for confirming a pairing of the computing device 502 with the wireless card reader, as described in reference to FIG. 3F.

Figures 6A, 6B:
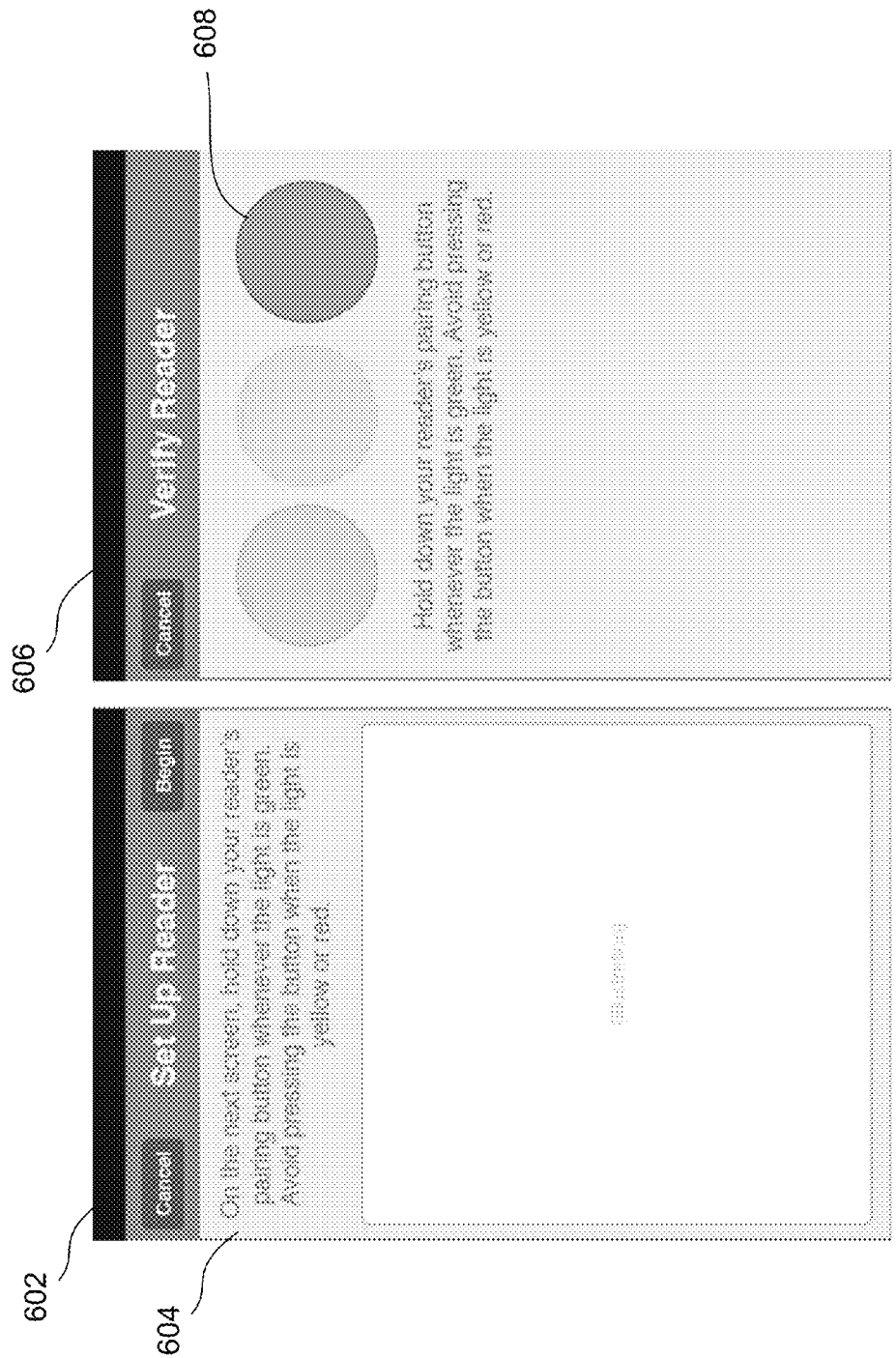
FIGS. 6A-6B illustrate an example technique for clicker verification.

FIG. 6A illustrates an example user interface 602 providing instructions 604 for performing clicker verification. A user can be instructed to perform clicker verification by clicking a pairing button on a wireless card reader when a certain event occurs. In some implementations, the user is instructed to press the pairing button on the wireless card reader when a green light is displayed, as described in reference to FIG. 6B.

FIG. 6B illustrates an example user interface 606 providing visual cues for performing clicker verification. In some implementations, a user is presented with a graphical traffic light 608 that includes a red, yellow, and green light. The user is instructed to press a pairing button on a wireless card reader whenever the green light is displayed as being lit, and to avoid pressing the pairing button when the red or yellow lights are displayed as being lit. The number of green lights for which the user needs to click the pairing button can vary depending on the implementation. For example, the user can be instructed to click the pairing button each time the light is green, for a total of three independent times the light is green.

A computing device on which the user interface 606 is presented can send data describing timings of when the user clicked the pairing button to the wireless card reader. The wireless card reader can determine whether the user has successfully clicked the pairing button on the wireless card reader at a time that is in synch with the occurrence of the green light by comparing timings of when the user clicked the pairing button with timings of when the green light was presented. The computing device is paired with the wireless card reader once the wireless card reader determines that the user has successfully clicked the pairing button in synch with the occurrence with a green light for a specified number of times.

FIG. 7A illustrates an example user interface 702 providing instructions 704 for performing clicker verification. A user can be instructed to perform clicker verification by clicking a pairing button on a wireless card reader when a certain event occurs. In some implementations, the user is instructed to press the pairing button on the wireless card reader while playing a visual game. For example, the user can be instructed to press the pairing button to make a virtual kangaroo leap over obstacles presented in a user interface, as described in reference to FIG. 7B.

FIG. 7B illustrates an example user interface 706 providing visual cues for performing clicker verification. In some implementations, a user is presented with a game 708 in the user interface 706 that displays a kangaroo encountering various obstacles. The user is instructed to press a pairing button on a wireless card reader whenever the kangaroo encounters an obstacle to make the kangaroo jump over the obstacle. The number of obstacles the user needs to make the kangaroo jump over can vary depending on the implementation. For example, the user can be instructed to click the pairing button each time the kangaroo encounters an obstacle, for a total of three independent obstacles.

A computing device on which the user interface 706 is presented can send data describing timings of when the user clicked the pairing button to the wireless card reader. The wireless card reader can determine whether the user has successfully clicked the pairing button on the wireless card reader at a time that is in synch with the kangaroo encountering an obstacle by comparing timings of when the user clicked the pairing button with timings of when the kangaroo encounters and obstacle. The computing device is paired with the wireless card reader once the wireless card reader determines that the user has successfully clicked the pairing button in synch with the kangaroo encountering an obstacle for a specified number of times.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular embodiments of the subject matter have been described. Other embodiments are within the scope of the following claims. For example, usage of the wireless card reader may not be limited to financial transactions but could also be applied to other environments, such as processing driver's licenses.

What is claimed is:

1. A method of pairing a wireless payment card reader and a mobile computing device, the method comprising:
   receiving, at the wireless payment card reader, first user input setting the wireless card reader in a pairing mode;
   sending, from the wireless payment card reader to the mobile computing device via a wireless communication link, an indication that a pairing mode of the wireless card reader is enabled;
   receiving, at the wireless payment card reader via the wireless communication link, an indication from the mobile computing device that a pairing mode of the mobile computing device is enabled;
   detecting, in the wireless payment card reader, a sequence of actuations, by a user, of a button on the wireless payment card reader;
   determining, in the wireless payment card reader, whether the sequence of actuations of the button corresponds to a desired timing sequence that corresponds to one or more instructions output by the mobile computing device while the mobile computing device is in the pairing mode; and
   in response to a determination that the sequence of actuations of the button matches the desired timing sequence, pairing the wireless payment card reader with the computing device.

2. The method of claim 1, wherein determining whether the sequence of actuations corresponds to a desired timing sequence comprises determining whether the sequence of actuations matches a sequence represented by sequence data stored in the wireless card reader.

3. The method of claim 1, wherein the sensor comprises a button on the wireless payment card reader, and wherein the sequence of actuations of the button includes a combination of pressing and holding the pairing button for one or more instances.

4. The method of claim 3, wherein the desired timing sequence includes at least one of the instances having a specified time duration.

5. The method of claim 1, wherein determining whether the sequence of actuations corresponds to a desired timing sequence comprises:
   determining, in the wireless payment card reader, whether an actual timing of each instance the pairing button on the wireless payment card reader is engaged satisfies a desired timing for the pairing button to be engaged, the desired timing corresponding to a timing of an outputting of a visual cue by the mobile computing device.

6. The method of claim 1, further comprising:
   sending, from the wireless payment card reader to the mobile computing device, data specifying a pairing technique for pairing the wireless payment card reader, the one or more instructions being dependent on the pairing technique.

7. A method of pairing a wireless card reader with a computing device, the method comprising:
   detecting, in the wireless card reader, a sequence of actuations of a sensor on the wireless card reader by a user;
   determining, in the wireless card reader, whether the sequence of actuations satisfies a predetermined timing criterion; and
   in response to a determination that the sequence of actuations satisfies the predetermined timing criterion, pairing the wireless card reader with the computing device.

8. The method of claim 7, wherein determining whether the sequence of actuations satisfies the predetermined timing criterion comprises determining whether the sequence of actuations corresponds to a desired timing sequence of actuations.

9. The method of claim 7, wherein determining whether the sequence of actuations satisfies the predetermined timing criterion comprises determining whether the sequence of actuations matches a sequence of actuations represented by data stored in the wireless card reader.

10. The method of claim 7, wherein determining whether the sequence of actuations satisfies the predetermined timing criterion comprises determining whether the sequence of actuations corresponds to one or more instructions presented on a user interface of the computing device.

11. The method of claim 7, wherein the sensor comprises a button on the wireless card reader, and wherein the sequence of actuations of the sensor includes a combination of pressing and holding the pairing button for one or more instances.

12. The method of claim 11, wherein the predetermined timing criterion includes at least one of the instances having a specified time duration.

13. The method of claim 7, wherein determining whether the sequence of actuations satisfies the predetermined timing criterion comprises:
   determining, in the wireless card reader, whether an actual timing of each instance the pairing button on the wireless card reader is engaged satisfies a desired timing for the pairing button to be engaged, the desired timing corresponding to a timing of an outputting of a visual cue by the computing device.

14. The method of claim 7, further comprising:
   sending, from the wireless card reader to the computing device, data specifying a pairing technique for pairing the wireless card reader.

15. The method of claim 7, further comprising:
   sending, from the wireless card reader to the computing device, an indication that a pairing mode of the wireless card reader is enabled; and
   receiving, at the wireless card reader, an indication from the computing device that a pairing mode of the computing device is enabled.

16. The method of claim 7, wherein the sensor comprises a button on the wireless card reader.

17. A wireless card reader comprising:
   a card read interface to read a card;
   a wireless transceiver to enable the card reader to communicate with a computing device over wireless link;
   a sensor capable of being actuated by a user of the card reader; and
   a processor configured to cause the wireless card reader to perform operations including:
      receiving first user input setting the wireless card reader in a pairing mode;
      sending, to the computing device over the wireless link, an indication that a pairing mode of the wireless card reader is enabled;
      receiving an indication from the computing device that a pairing mode of the computing device is enabled;
      receiving second user input indicative of a sequence of actuations of the sensor;
      determining whether the sequence of actuations satisfies a predetermined criterion; and in response to a determination that the sequence of actuations satisfies the predetermined criterion, pairing the wireless card reader with the computing device.

18. The wireless card reader of claim 17, wherein determining whether the sequence of actuations satisfies the predetermined criterion comprises determining whether the sequence of actuations corresponds to a desired timing sequence.

19. The wireless card reader of claim 17, wherein determining whether the sequence of actuations satisfies the predetermined criterion comprises determining whether the sequence of actuations matches a sequence represented by data stored in the wireless card reader.

20. The wireless card reader of claim 17, wherein determining whether the sequence of actuations satisfies the predetermined criterion comprises determining whether the sequence of actuations corresponds to one or more instructions presented on a user interface of the computing device.

21. The wireless card reader of claim 17, wherein the sensor comprises a button on the wireless card reader, and wherein the sequence of actuations of the sensor includes a combination of pressing and holding the pairing button for one or more instances.

22. The wireless card reader of claim 21, wherein the predetermined criterion includes at least one of the instances having a specified time duration.

23. The wireless card reader of claim 17, wherein determining whether the sequence of actuations satisfies the predetermined criterion comprises:
 determining, in the wireless card reader, whether an actual timing of each instance the pairing button on the wireless card reader is engaged satisfies a desired timing for the pairing button to be engaged, the desired timing corresponding to a timing of an outputting of a visual cue by the computing device.

24. The wireless card reader of claim 17, wherein the operations further comprise:
 sending, from the wireless card reader to the computing device, data specifying a pairing technique for pairing the wireless card reader.

25. The wireless card reader of claim 17, wherein the operations further comprise:
 sending, from the wireless card reader to the computing device, an indication that a pairing mode of the wireless card reader is enabled; and
 receiving, at the wireless card reader, an indication from the computing device that a pairing mode of the computing device is enabled.

26. The wireless card reader of claim 17, wherein the sensor comprises a button.

* * * * *